United States Patent [19]

Pavlath

[11] Patent Number: 4,632,551

[45] Date of Patent: Dec. 30, 1986

[54] PASSIVE SAMPLING INTERFEROMETRIC SENSOR ARRAYS

[75] Inventor: George A. Pavlath, Thousand Oaks, Calif.

[73] Assignee: Litton Systems, Inc., Beverly Hills, Calif.

[21] Appl. No.: 619,119

[22] Filed: Jun. 11, 1984

[51] Int. Cl.⁴ .............................................. G01B 9/02
[52] U.S. Cl. .................................... 356/345; 250/227
[58] Field of Search ..................... 350/345; 356/352; 250/227

[56] References Cited

U.S. PATENT DOCUMENTS 4,443,700  4/1984  Macedo et al. ................ 250/227
4,505,587  3/1985  Haus et al. .................... 356/345

FOREIGN PATENT DOCUMENTS 8301303  4/1983  PCT Int'l Appl. ............... 356/350

OTHER PUBLICATIONS

"Passive Multiplexing Systems for Fiber Optic Sensors", Nelson et al., Applied Optics, 9-1980, pp. 2917-2920.

"Passive Multiplexing Techniques for Fiber Optic Sensor Systems", Nelson et al., I.F.O.C., 3-1981, pp. 27-30.

Primary Examiner—Vincent P. McGraw
Assistant Examiner—S. A. Turner
Attorney, Agent, or Firm—John H. Lynn

[57] ABSTRACT

This invention provides a sensor array using a plurality of fiber optic sensors connected between transmit fibers and receive fibers. The laser transmitter supplies pulses to the transmit fiber and fiber optic couplers couple the pulses from the transmit fiber into the fiber optic sensors. The pulses from the laser transmitter may be frequency chirped or frequency stepped to provide passive sampling of interferometric sensors in addition to intensity sensors, or otherwise frequency modulated. Each sensor is configured to respond to changes in a predetermined physical parameter by altering the shape of the pulse input thereto. Fiber optic couplers couple the sensor output signals into the receive fiber for input to a receiver, which converts the optical signals into electrical signals for input to a processer. A timing reference correlates the sensor output pulses with the sensors.

25 Claims, 12 Drawing Figures

PASSIVE SAMPLING INTERFEROMETRIC SENSOR ARRAYS

BACKGROUND OF THE INVENTION

This invention relates generally to apparatus and methods for sensing physical phenomena and particularly to fiber optic sensors which use interferometers to sense changes in physical phenomena.

Optical fibers are sensitive to a large number of physical phenomena, such as acoustic waves and temperature fluctuations. An optical fiber exposed to such phenomena changes the amplitude, phase, or polarization of light propagating therethrough. Optical fibers have been considered for use as sensing elements in hydrophones, magnetometers, accelerometers and current sensors.

Mach-Zehnder, Sagnac and resonant ring interferometers have been used as sensors. In Mach-Zehnder and Sagnac interferometers, the phase difference between interfering lightwaves varies in response to the variations in the sensed quantity, and thus, by detecting the intensity of light produced by such interfering waves, the magnitude of the sensed quantity may be determined. In addition, the detected intensity varies with the phase difference between the interfering light waves. Typically, the interferometer is biased to operate at the point of maximum slope on a cosine curve, the sensed quantity being detected by measuring fluctuations in intensity from this quiescent operating point.

The resonant ring interferometric sensor uses an all-fiber optic ring resonator. The curve of output power with respect to optical wavelength of the fiber optic ring resonator is in the form of an extremely sharp spike. The maximum slope of the output curve, assuming a resonator having a finesse of about 80, is on the order of 14/rad. The all-fiber optic ring resonator therefore provides a highly accurate fiber optic sensor for measuring physical phenomena which affect the parameters of the light propagating through the fiber.

It is possible to use such sensors to detect acoustic vibrations, thermal fluctuations, variations in electromagnetic fields and other physical phenomena. An acoustic wave incident on the fibers which comprise the sensors causes the optical lengths thereof to vary as a function of the acoustic wave magnitude and frequency. The variation of loop length causes the output power of the resonator to vary in a predictable manner. By detecting the variation in output power, a direct indication of the magnitude and the frequency of the acoustic waves may be obtained.

Arrays of sensors are used in various geophysical exploration and antisubmarine warfare applications. Present sensor arrays include many wires, which make them expensive and difficult to operate.

SUMMARY OF THE INVENTION

This invention provides a sensor array using a plurality of fiber optic sensors that may be connected to a single transmit fiber and a single receive fiber. The sensors are passive with no control or feedback lines connected thereto and are sequentially sampled using a small number of optical fibers.

The sensors in the array may be of any type in which changes in a physical parameter cause changes in the propagation characteristics of an optical fiber. Suitable sensors typically include any type of interferometric sensor such as Sagnac, resonance, Mach-Zehnder, Michelson and polarimetric interferometers and may include other fiber optic sensors that are responsive to changes in displacement, temperature or changes in ambient electrical magnetic fields.

The sensors may be connected in parallel across the transmit and receive fibers and are preferably connected thereto by evanescent field couplers in single mode fiber applications.

The invention includes a laser transmitter that supplies frequency chirped and frequency stepped pulses or otherwise frequency modulated pulses to the transmit fiber. The result of such modulation of the input pulses is that interferometric sensors may be sampled passively in addition to intensity sensors.

The sensor array of the invention is an all fiber design which results in a system which is simpler than prior sensor arrays while having a sensitivity which is equal to or better than prior sensor arrays. The reduced complexity of the array as compared to prior sensor arrays allows considerable savings in cost of fabrication and maintenance. Since the sensor array is passive with no electrical signal or control wires connected thereto, the array is immune to electromagnetic interference and radio frequency interference.

Sequential sampling techniques are used to sample the individual sensors in the array to permit the use of a large number of sensors using only a single transmit fiber and a single receive fiber. The system is adaptable to the use of both interferometric and amplitude-type sensors formed of either single mode or multimode fibers, thereby affording a large degree of flexibility in constructing an array for a given application.

DESCRIPTION OF THE PREFERRED EMBODIMENT

System Components

Figures 1, 6, 7:
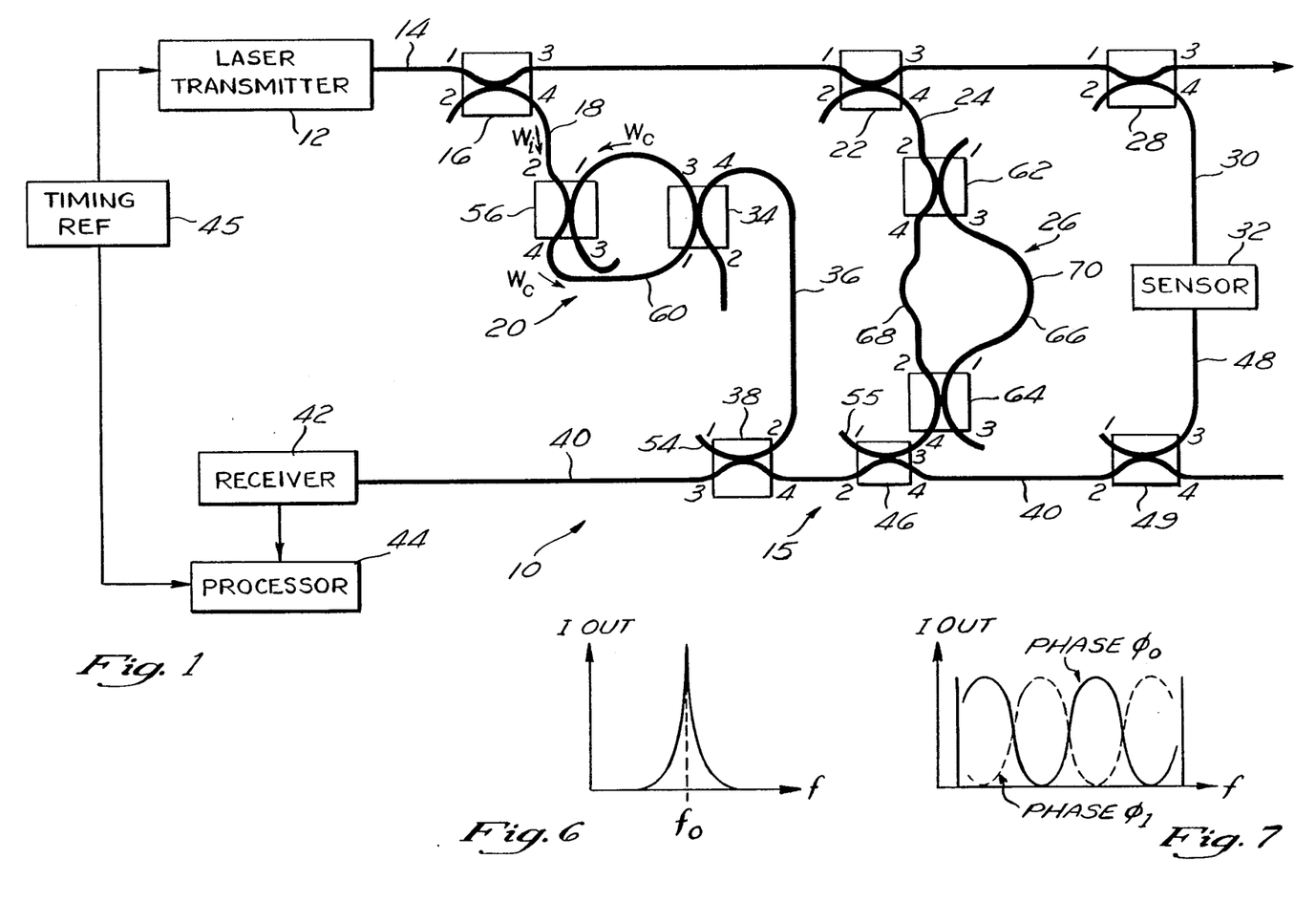
FIG. 1 is a schematic diagram of the invention.
FIG. 6 illustrates the output waveform of a resonant sensor which may be used in the sensor array of FIG. 1.
FIG. 7 illustrates the output waveform of a second type of sensor which may be used in the sensor array of FIG. 1.

A sensor system 10 according to the present invention includes a laser transmitter 12, which provides means for introducing laser light signals into a transmit fiber 14 for input to a sensor array 15. The transmit fiber 14 may be either a single mode fiber or a multimode fiber with either a step index of refraction or a graded index change between the core and cladding of the fiber 14. The laser transmitter 12 includes a suitable source of coherent light and may include a lens (not shown) for focusing light on the fiber 14 and an optical isolator (not shown) for preventing light reflected from the lens and the fiber 14 from entering the coherent light source and thereby interfering with the operation thereof.

In a preferred embodiment of the invention, the fiber 14 comprises a single mode fiber having a core diameter of about 10 microns, an effective core area of about $1.6 \times 10^{-7}$ cm$^2$, an effective refractive index of 1.46 and an attenuation of 0.5 dB/km at a wavelength of 1.3 microns.

The coherent light source preferably provides a pulsed light impulse to the transmit fiber 14. Light propagates from the laser transmitter 12 through the transmit fiber 14 by means of total internal reflection at the core-cladding interface, as has long been known in the art. The transmit fiber 14 passes through a first optical coupler 16 that couples a portion of the light intensity input thereto into a fiber 18 for input into a resonant sensor 20. Light remaining in the transmit fiber 14 after passing through the optical coupler 16 is incident upon a second optical coupler 22 that couples a portion of the light intensity incident thereon into a first end of a fiber 24 for input to an all-fiber Mach-Zehnder interferometer 26.

Light remaining in the transmit fiber 14 after passing through the optical coupler 22 is incident upon a third optical coupler 28 that couples a portion of the light incident thereon into a fiber 30 for input into a sensor 32, which may be any suitable sensor that responds to a selected physical parameter and produces a change in the propagation characteristics of optical fiber.

As shown in FIG. 1, the sensor array 15 includes only the resonant sensor 20, the Mach-Zehnder interferometer 26 and the sensor 32 as sensing elements. However, the transmit fiber 14 may extend beyond the optical coupler 28 to provide input light into any number of sensors (not shown) with the primary limitation on the number of sensors being the signal intensity that may with practicality be input to each sensor and the signal intensity that may be received and detected from each sensor. The sensor array 15 illustrated in FIG. 1 is an exemplary preferred embodiment to explain the structure and method of the operation of the sensor system 10. The resonant sensor 20 supplies an output signal through an optical coupler 34 to a fiber 36; and an optical coupler 38 couples the resonant sensor output signal to a receive fiber 40 for input to a receiver 42, which may include a suitable photodiode (not shown) that converts optical inputs into electrical signals for output to a signal processor 44. A timing reference circuit 45 controls both the laser transmitter 12 and the signal processor 44.

The output of the Mach-Zehnder interferometer 26 appears at the second end of the fiber 24 and is input to an optical coupler 46 that couples the Mach-Zehnder output into the receive fiber 40.

Similarly, the sensor 32 produces an output signal on a fiber 48; and a coupler 49 couples a portion of the output of the sensor 32 into the receive fiber 40. The portion of the output of the sensor 32 coupled into the receive fiber 40 is input to the coupler 46. Therefore, a fraction of the output of the sensor 32 on the receive line 40 is coupled into the fiber 24, which has a free end 55 through which light propagates out of the sensor system 10. The output of the coupler 46 is the sum of the portion of the Mach-Zehnder output coupled into the receive fiber 40 and the portion of the output of the coupler 49 which the coupler 46 permits to remain in the receive fiber 40.

The coupler 38 couples a fraction of the output of the coupler 46 out of the sensor system 10 at a free end 54 of the fiber 36. Therefore, if the coupling constants of the couplers 38, 46 and 49 are 50%, the signal input to the receiver 42 is the sum of 50% of the output of the resonant sensor 20, 25% of the output of the Mach-Zehnder interferometer 26, and 12.5% of the output of the sensor 32.

Optical Couplers

All of the optical couplers 16, 22, etc. may be substantially identical; therefore, the following description of the structure and method of operation of an optical coupler is applicable to all of the couplers employed in single mode fiber applications. In multimode fiber implementations of the sensor system 10 any suitable multimode couplers well known in the art may be used.

A fiber optic directional coupler suitable for use in single mode application as the couplers illustrated in FIG. 1 is described in the Mar. 29, 1980 issue of *Electronics Letters, Vol.* 16, No. 7, pp. 260-261.

Figure 2:
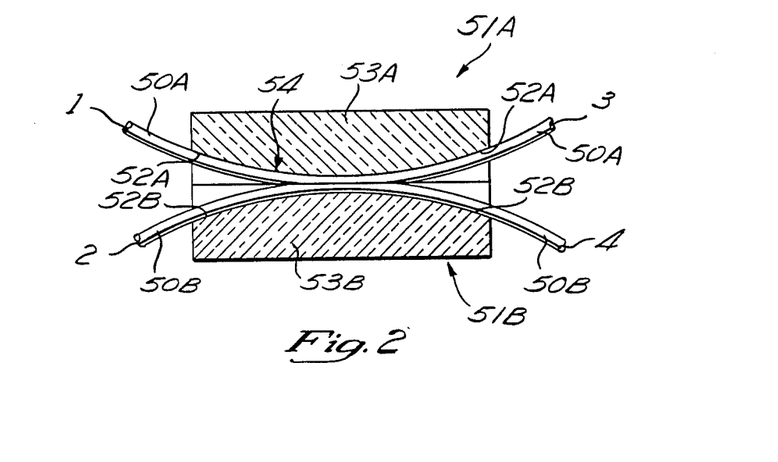
FIG. 2 illustrates the structure of fiber optic couplers included in FIG. 1.

As illustrated in FIG. 2, the coupler 16, for example, includes two strands 50A and 50B of a single mode optical fiber mounted in a pair of curved grooves 52A and 52B, respectively, formed in optically flat, confronting surfaces of a pair of rectangular bases or blocks 53A and 53B, respectively. The block 53A with the strand 50A mounted in the groove 52A comprises a coupler half 51A, and the block 53B with the strand 50B mounted in the groove 52B comprises a coupler half 51B.

The curved grooves 52A and 52B each have a radius of curvature which is very large compared to the diameters of the strands 50A and 50B. The widths of the grooves 52A, 52B are slightly larger than the fiber diameter to permit the strands 50A and 50B, when mounted therein, to conform to a path defined by the bottom walls of the grooves 52A and 52B, respectively. The depths of the grooves 52A and 52B vary from a minimum at the centers of the blocks 53A and 53B, respectively, to a maximum at the edges of the blocks 53A and 53B, respectively. The variation in groove depth permits the fiber optic strands 50A and 50B, when mounted in the grooves 52A and 52B, respectively, to gradually converge toward the center and diverge toward the edges of the blocks 53A, 53B, thereby eliminating any sharp bends or abrupt changes in direction of the fibers 50A, 50B which may cause power loss through mode perturbation. The grooves 52A and 52B may be rectangular in cross-section, however, it will be understood that other suitable cross-sectional contours, such as U-shaped or V-shaped, which will accommodate the fibers 50A, 50B may be used.

At the centers of the blocks 53A, 53B in the embodiment shown, the depths of the grooves 52A, 52B which mount the strands 50A, 50B, respectively, are less than the diameters of the strands 50A, 50B after fabrication. At the edges of the blocks 53A, 53B, the depth of the grooves 52 is preferably at least as great as the diameter of the strands 50A, 50B. Fiber optic material is removed from each of the strands 50A, 50B, e.g., by lapping, to form oval-shaped planar surfaces, which are coplanar with the confronting surfaces of the blocks 53A, 53B. These oval surfaces where the fiber optic material has been removed from an interaction region 54. Thus, the amount of fiber optic material removed increases gradually from zero towards the edges of the blocks 53A, 53B to a maximum towards the centers of the blocks 53A, 53B. This tapered removal of the fiber optic material enables the fibers 50A, 50B to converge and diverge gradually, which is advantageous for avoiding backward reflection and excessive loss of light energy.

In the embodiment shown, the coupler halves 51A and 51B are substantially identical and are assembled by placing the confronting surfaces of the blocks 53A and 53B together, so that the facing surfaces of the strands 50A and 50B are juxtaposed in facing relationship.

Light is transferred between the strands 50A, 50B by evanescent field coupling at the interaction region 54. It has been found that to ensure proper evanescent field coupling, the amount of material removed from the fibers 50A, 50B must be carefully controlled so that the spacing between the core portions of the strands 50A, 50B is within a predetermined critical zone. The evanescent fields extend a short distance into the cladding and decrease rapidly in magnitude with distance outside the fiber cores. Thus, sufficient material should be removed to permit overlap between the evanescent fields of the strands 50A, 50B. If too little material is removed, the cores will not be sufficiently close to permit the evanescent fields to cause the desired interaction of the guided modes; and thus, insufficient coupling will result. Conversely, if too much material is removed, the propagation characteristics of the fibers will be altered, resulting in loss of light energy due to mode perturbation. However, when the spacing between the cores of the strands is within the critical zone, each strand 50A, 50B receives a significant portion of the evanescent field energy from the other strand 50A, 50B to achieve good coupling without significant energy loss. The critical zone includes that area in which the evanescent field of the fibers 50A and 50B overlap with sufficient strength to provide evanescent field coupling, i.e., each core is within the evanescent field of the other. However, as previously indicated, mode perturbation occurs when the cores are brought too close together. For example, it is believed that, for weakly guided modes, such as the $HE_{11}$ mode in single mode fibers, mode perturbation begins to occur when sufficient material is removed from the fibers 50A, 50B to expose the fiber cores. Thus, the critical zone is defined as the core spacing in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone may be quite narrow. In a single mode fiber coupler of the type shown, the required center-to-center spacing between the strands 50A, 50B at the center of the coupler is typically less than a few (e.g., 2-3) core diameters.

Preferably, the strands 50a and 50B (1) are identical to each other; (2) have the same radius of curvature at the interaction region 54; and (3) have equal amounts of fiber optic material removed therefrom to form the interaction region 54. Thus, the strands 50A, 50B are symmetrical through the interaction region 54 in the plane of their facing surfaces, so that their facing surfaces are coextensive if superimposed. Therefore, the two fibers 50A and 50B will have the same propagation characteristics at the interaction region 54, thereby avoiding reduction in coupling associated with dissimilar propagation characteristics.

The blocks or bases 53A, 53B may be fabricated of any suitably rigid material. In one preferred embodiment, the bases 53A, 53B each comprise generally rectangular blocks of fused quartz glass approximately 1 inch long, 1 inch wide, and 0.4 inch thick. In this embodiment, the fiber optic strands 50A, 50B are secured in the slots 52A, 52B, respectively by a suitable cement (not shown), such as epoxy glue. One advantage of the fused quartz blocks 53A, 53B is that they have a coefficient of thermal expansion similar to that of glass fibers; and this advantage is particularly important if the blocks 53A, 53B and strands 50A, 50B are subjected to any heat treatment during the manufacturing process. For some applications the coupler 16 may comprise only the two fibers 50A and 50B with the corresponding exposed core portions being fused or bonded together without being secured in the blocks 53A, 53B.

The coupler 16 of FIG. 2 includes four ports, labeled 1, 2, 3 and 4. When viewed from the perspective of FIG. 2, ports 1 and 2 which correspond to strands 50A and 50B, respectively, are on the left-hand side of the coupler 16, while the ports 3 and 4, which correspond to the strands 50A and 50B, respectively, are on the right-hand side of the coupler 16. For the purposes of explanation, it is assumed that input light is applied to port 1. The input light passes through the coupler 16 and is output at either one or both of port 3 and port 4 depending upon the coupling between the strands 50A and 50B. The term "coupling constant" is defined as the ratio of the coupled power to the total output power. In the above example, the coupling constant equals the ratio of the power output at port 4 divided by the sum of the power output at ports 3 and 4. This ratio is also referred to as the "coupling efficiency", and when so used, is typically expressed as a percent. Thus, when the term "coupling constant" is used herein, it should be understood that the corresponding coupling efficiency is equal to the coupling constant times 100. For example, a coupling constant of 0.5 is equivalent to a coupling efficiency of 50%.

The coupler may be tuned to adjust the coupling constant to any desired value between zero and 1.0, by offsetting the facing surfaces of the blocks 53A, 53B. Tuning may be accomplished by sliding the blocks 53A, 53B laterally or longitudinally relative to each other.

The coupler 16 is highly directional, with substantially all of the power applied at one side thereof being output at the ports on the other side of the coupler. Substantially all of the light applied to input port 1 is delivered to the ports 3 and 4, without appreciable contra-directional coupling to port 2. Likewise, substantially all of the light applied to port 2 is delivered to the ports 3 and 4. Further, the directional characteristic is symmetrical, so that substantially all of the light applied to either port 3 or input port 4 is delivered to the ports 1 and 2. Moreover, the coupler 16 is essentially non-discriminatory with respect to polarizations, and thus, preserves the polarization of light input thereto. Thus, for example, if a light beam having a vertical polarization is input to port 1, the light cross-coupled from port 1 to port 4, as well as the light passing straight through from port 1 to port 3, will remain vertically polarized.

Light that is cross-coupled from one of the strands 50A, 50B to the other undergoes a phase shift of $\pi/2$, while light that is not cross-coupled is not shifted in phase during propagation through the coupler 16. Thus, for example, if light is input to port 1, the cross-coupled light output at port 4 will be advanced in phase by $\pi/2$, while the light passing straight through to port 3 remains unchanged in phase.

The coupler 16 is a low loss device, having insertion or throughput losses typically on the order of 0.1 to 0.2 percent. The term "insertion loss", as used herein, refers to the real scattering losses of light passing through the coupler 16 from one side to the other. For example, if light is applied to port A, and 97% of that light reaches ports C and D (combined), the insertion loss would be 0.03 (3). The term "coupler transmission" is defined as one minus the insertion loss. Thus, if the insertion loss is 0.03 (3%), the coupler transmission is 0.97 (97%).

The Resonator

Figure 3:
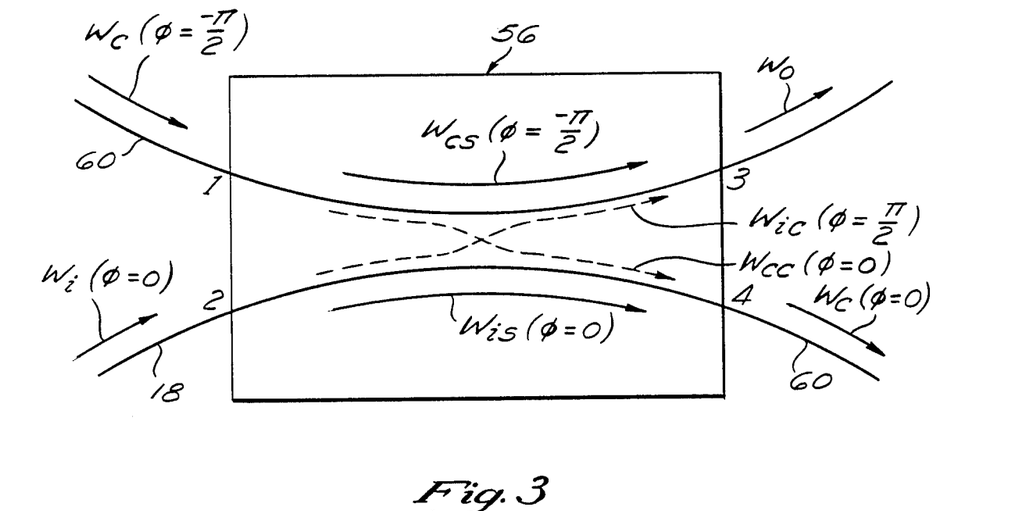
FIG. 3 illustrates relationships between inputs and outputs of the coupler of FIG. 2.

Referring to FIGS. 1 and 3, light introduced from the laser transmitter 12 into the transmit fiber 14 propagates to port 1 of the coupler 16, where a portion of the light is coupled to port 4, with the remaining portion propagating to port 3. The light at port 4 of the coupler 16 propagates through the fiber 18 to port 2 of a coupler 56 which couples a portion of the light input thereto to port 3 from which light passes out of the end of the fiber 18. The remainder passes to port 4. The fiber 18 forms a loop 60 by entering the coupler 56 at port 1. Light at port 4 traverses the loop 60 and again enters the coupler 56 at port 1, where a portion is coupled to port 4 while the remaining portion propagates to port 3 and out of the fiber 18. The loop 60 and coupler 56 cooperate to provide a resonant cavity so that light entering the coupler 56 at port 1 interferes with incoming light at port 2 from the laser transmitter 12. The interference is constructive at port 4 because of the phase shifts in the coupler 56 and the loop 60, thereby causing the light intensity to build up in the resonant cavity loop 60. The interference is constructive only when the frequency of the input light matches the resonant frequency of the resonator.

Hereinafter, the light from the laser transmitter 12, propagating through the fiber portion 18 to port 2, is referred to as the input signal wave $W_i$, and light circulating in the loop 60 is referred to as the circulating wave $W_c$.

A portion of the circulating wave $W_c$ passes into port 1 of the coupler 34, which couples a portion of $W_c$ to port 4 for input to the fiber 36 to form the output of the resonator 20. The remainder of $W_c$ propagates through the coupler 34 to port 3 thereof for circulation through the loop 60.

As the circulating wave $W_c$ propagates about the loop 60, from port 4 to port 1 of the coupler 56 a fractional amount of power will be lost due to fiber transmission losses. The term "fiber transmission losses" is defined as the fractional loss during propagation through the fiber, from port 4 to port 1 of the coupler 56. In the embodiment shown, the fiber transmission losses are purely a function of fiber attenuation, so that the power, or intensity, of the wave $W_c$ at port 1 is equal to the product of the power of the wave $W_c$ at port 4 and the quantity $\exp(-2\alpha_o L)$, where L is the optical path length of the loop 60 for light circulating therethrough, excluding any loss of the coupler 20, and $\alpha_o$ is the amplitude attenuation coefficient of the fiber 18. It will be understood that, if an additional component (e.g., a fiber optic polarizer) is placed in the fiber loop 60, the losses attributable to this component are included within the definition of fiber transmission losses. In addition, the term "fiber transmission" is defined as the circulating wave power at port 1 divided by the circulating wave power at port 4. Stated another way, fiber transmission is the fractional amount of power from port 4 that reaches port 1.

In addition to being attenuated by fiber transmission losses, the circulating wave $W_c$ will be degraded slightly on each pass through the coupler 56 due to coupler insertion losses. Further, the power or intensity of the input wave $W_i$ will experience a loss due to coupler insertion losses during propagation through the coupler 56. In this regard, the coupler 56 may be modeled as a lossless device with an added lumped insertion loss that is independent of the coupling constant. The relationship between the coupler insertion loss and the complex amplitudes at each of the four ports of the coupler 56 is:

$$|E_4|^2 + |E_3|^2 = (1-\gamma_o)(|E_1|^2 + |E_2|^2) \qquad (1)$$

where: $E_1$, $E_2$, $E_3$, and $E_4$ are the complex electric field amplitudes at the coupler ports 1, 2, 3, and 4; and $\gamma_o$ is the coupler insertion loss, which is typically on the order of 0.1% to 0.2%.

The complex amplitudes at ports 4 and 3, after the coupled-mode interaction, are related to the field amplitudes at ports 1 and 2 as follows:

$$E_4 = (1-\gamma_o)^{\frac{1}{2}}[(1-K)^{\frac{1}{2}}E_2 + iK^{\frac{1}{2}}E_1] \qquad (2)$$

15 and, $$E_3 = (1-\gamma_o)^{\frac{1}{2}}[iK^{\frac{1}{2}}E_2 + (1-K)^{\frac{1}{2}}E_1] \qquad (3)$$

where K is the intensity coupling constant and i is the square root of $-1$. No coupling corresponds to $K=0$, whereas $K=1$ provides full coupling. $E_1$ and $E_4$ are futher related in that:

$$E_1 = E_4 e^{-\alpha_o L} e^{i\beta L} \qquad (4)$$

where:

$$\beta = n\omega/c \qquad (5)$$

and $\alpha_o$ is the amplitude attenuation coefficient of the fiber 18; L is the length of the fiber loop portion 60; n is the effective refractive index of the fiber 18; $\omega$ is the optical frequency; $\beta$ is the propagation constant of the fiber 18; and c is the speed of light.

For full resonance, the output at port 3 should be zero, and thus, the ratio $E_3/E_2$ should be zero. Accordingly, by solving Equations 2, 3 and 4, for $E_3/E_2$ in terms of $\gamma_o$, K, $\alpha_o L$, and $\beta L$, and setting $E_3/E_2$ equal to zero, the conditions for resonance, in terms of the loop length L and the coupling constant K, may be found. One of the conditions necessary for resonance is that:

$$\beta L = 2\pi q - \pi/2 \qquad (6)$$

where q is any integer.

Thus, for full resonance, the total phase delay ($\beta L$) around the loop 60, excluding any phase shift due to the coupler 56, must equal an integral number of $2\pi$ radians, less $\pi/2$.

From Equations 2 and 3 the directional coupler 56 causes a $+\pi/2$ phase shift on the coupled wave. By adding this phase shift to $\beta L$ in Equation 6, it may be seen that the total accumulated phase of the circulating wave $W_c$ as it traverses the loop 60 (e.g., from an arbitrary point on the loop, around the loop, back to that arbitrary point) is equal to $2\pi q$. The loop length may be adjusted to satisfy this resonant condition after assembly of the resonator by mechanically stretching the fiber 18 by any suitable means such as an electrically driven piezoelectric cylinder about which the fiber 14 is wrapped. The loop length or the frequency may be adjusted to satisfy the resonance condition of Equation 6.

The resonant condition defined by Equation 6 may be more fully understood through reference to FIG. 3, which shows the manner in which the $\pi/2$ phase shift of the coupler 56 is advantageously utilized to provide constructive interference at port 4, and destructive interference at port 3. For purposes of discussion, the coupler 56 may be viewed as having a point of effective coupling at the center thereof with the ports 1, 2, 3, and 4 being equidistant from this point and spaced therefrom by an integral number of wavelengths. The loop 60 length (L) may be viewed as the distance from the coupling point, around the loop 60, and back to the coupling point, which, for resonance, should be q wavelengths, where q is an integer.

In FIG. 3 the input signal wave $W_i$ is assumed to be a reference wave having zero phase, and the phases of all of other waves (i.e., $W_c$) are defined relative to the input wave $W_i$. Any wave propagating through the coupler 56 will be divided into two components, namely, a "cross-coupled" component designated by the subscript "c", and a "straight through" component, designated by the subscript "s". Thus, the input wave $W_i$ will be divided into a cross-coupled component $W_{ic}$, which propagates from port 2 to port 3, and a straight through component $W_{is}$ which propagates from port 2 to port 4. Similarly, the wave $W_c$ will be divided into a cross-coupled component $W_{cc}$, which propagates from port 1 to port 4, and a straight through component $W_{cs}$, which propagates from port 1 to port 3.

Assuming the source 12 is turned on at t=0, the input wave $W_i$ will enter port 2 of the coupler 56, with zero phase, for propagation therethrough. The cross-coupled component $W_{ic}$ will undergo a $+\pi/2$ phase shift during propagation to the port 3, while the straight through component $W_{is}$ will remain unchanged in phase during propagation to port 4. Thus, the light wave $W_c$ at port 4 will have a phase of zero. This wave $W_c$ then propagates about the loop 60 to port 1. Assuming that the loop length L is chosen in accordance with Equation 6, the wave $W_c$, upon reaching port 2, will have a phase of $-\pi/2$. During propagation of the wave $W_c$ through the coupler 56, the cross-coupled components $W_{cc}$ undergoes a $+\pi/2$ phase shift, so that, upon reaching port 4, its phase is zero, the same as that of the input wave component $W_{is}$. Thus, the circulating wave component $W_{cc}$ will constructively interfere with the input wave component $W_{is}$ at port 4, thereby increasing the intensity of the circulating wave $W_c$. The straight through component $W_{cs}$ of the circulating wave $W_c$, on the other hand, does not change in phase as it propagates from port 1 to port 3, so that, at port 3, the phase will still be $-\pi/2$. Thus, the component $W_{cs}$ will destructively interfere with the cross-coupled input light component $W_{ic}$, which has a phase of $+\pi/2$.

Figure 4:
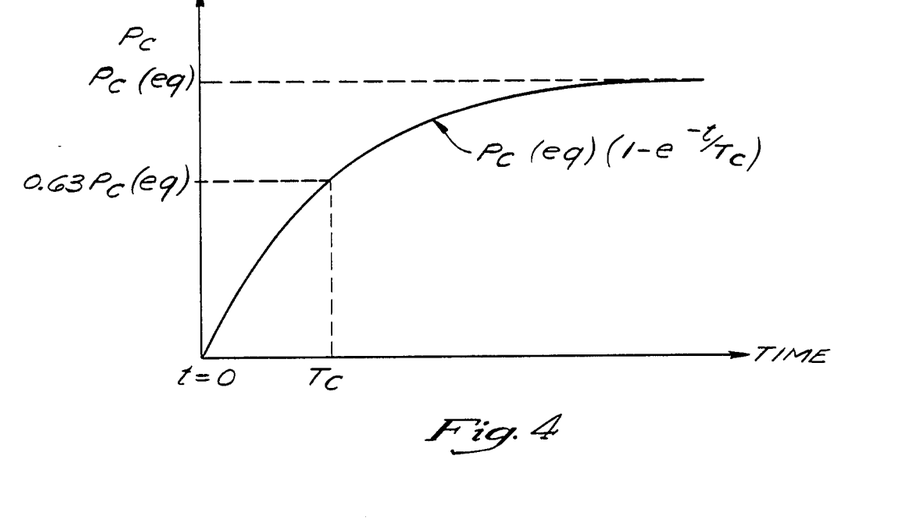
FIG. 4 graphically illustrates circulating power in a resonant sensor as a function of time.

Consequently, as the wave $W_c$ circulates through the loop 60, it will constructively interfere with the input signal wave $W_i$ at port 4, and destructively interfere therewith at port 3, thereby gradually and asymptotically building up the power $P_c$ of light circulating in the loop 60 until an equilibrium value $P_{c(eq)}$ is reached, as shown in FIG. 4. The time required for such light to build up to 63% (i.e., $1-e^{-1}$) of the equilibrium value is defined as the cavity rise time also commonly referred to as the cavity decay time.

In order to achieve full resonance at the equilibrium value, and thus, zero output power at port 3, a second condition must be satisfied, namely, the straight through circulating wave component $W_{cs}$ at port 3 must have an amplitude equal to the amplitude of cross-coupled input signal component $W_{ic}$ at port 3. For this condition to occur, the coupling constant K is adjusted to a value $K_r$, which is referred to hereinafter as the "resonant coupling constant". The adjustment is made by translating coupler halves parallel to the interface between them and perpendicular to the fiber. Resonance is measured by observing the intensity output of port 3 of coupler 56. When this output is zero, resonance is achieved. By solving Equations 2, 3, and 4 for $E_3/E_2$, and setting $E_3/E_2$ equal to zero, the condition for resonance, the resonant coupling constant $K_r$ is found to be:

$$K_r = (1-\gamma_o)\exp(-2\alpha_o L) \tag{7}$$

In the embodiment shown, the coupler transmission is $1-\gamma_o$ and the fiber transmission is $\exp(-2\alpha_o L)$. Thus, $$K_r = \text{coupler transmission} \times \text{fiber transmission} \tag{8}$$

For an exemplary preferred embodiment, the fiber attenuation is 8.3 dB/km, the loop 60 is 10 meters in length, so that $2\alpha_o L$ equals 0.0191 at a wavelength of 632.8 nm. With a coupler insertion loss of 1.8%, the resonant coupling constant is 0.963 which is readily attainable with couplers constructed as described hereinabove.

Using the resonant coupling constant defined by Equation 7, Equations 2, 3, and 4 yield the following circulating power and output power, normalized with respect to input power:

$$\left|\frac{E_4}{E_2}\right|^2 = \frac{P_{c(4)}}{P_i} = \frac{(1-\gamma_o)(1-K_r)}{(1+K_r)^2 - 4K_r\sin^2(\beta L/2 - \pi/4)} \tag{9}$$

$$\left|\frac{E_3}{E_2}\right|^2 = \frac{P_0}{P_i} = \tag{10}$$

$$(1-\gamma_o)\left[1 - \frac{(1-K_r)^2}{(1+K_r)^2 - 4K_r\sin^2(\beta L/2 - \pi/4)}\right]$$

where $P_{c(4)}$ is the power of the circulating wave $W_c$ at port 4; $P_i$ is the power of the input signal wave $W_i$; and $P_0$ is the power of the output wave $W_0$ at port 3.

If $\beta L$ is chosen to satisfy the resonant condition defined by Equation 6, Equation 9 reduces to:

$$\frac{P_c}{P_i}\max = \frac{1-\gamma_o}{1-K_r} \tag{11}$$

Equation 11 may be rewritten as:

$$P_i = P_c(1-K_r) + P_i\gamma_o \tag{12}$$

If Equation 6 is satisfied, $1-K_r$ is equal to the round-trip fractional intensity loss for the circulating wave $W_c$, (i.e., coupler insertion loss plus fiber transmission loss). Thus, the right-hand side of Equation 12 represents the total power dissipated in the coupler 56 and loop 60. Accordingly, it may be seen from Equation 12 that, at full resonance, the circulating power $P_c$ is such that the total power dissipated in the loop and coupler equals the input power $P_i$ at port 2.

Figure 5:
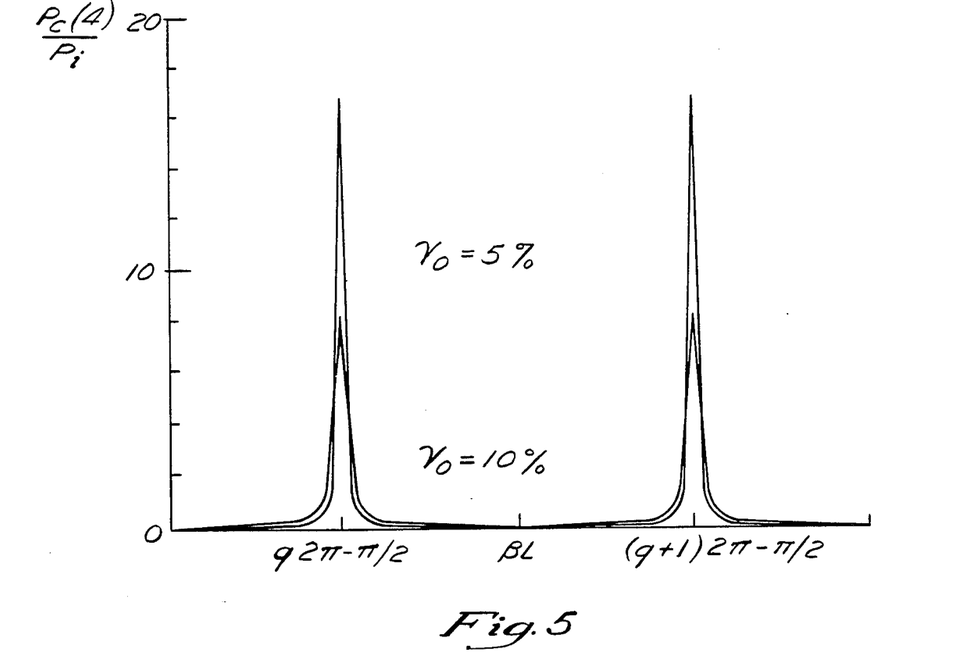
FIG. 5 graphically illustrates normalized circulating power in a resonant sensor as a function of phase delay for representative insertion losses.

The theoretical normalized circulating power and output power, defined by Equations 9 and 10, respectively, are shown as functions of $\beta L$ for two exemplary coupler insertion loss values, namely, 5% and 10%, in FIG. 5. Although these curves are for a loop length of 3 meters ($2\alpha_o L = 0.0057$), it will be understood that similar curves may be developed for a 10-meter loop length. As shown in FIG. 5, circulating power $P_c$ is highly dependent upon coupler insertion losses, being about 9 times the input power $P_i$ for an insertion loss of 10%, and almost 19 times input power $P_i$ for an insertion loss of 5%. The output power $P_o$, in contrast, drops to zero at full resonance in either case. However, it will be seen that the maxima of FIG. 5 become sharper as insertion loss decreases, indicating that cavity finesse is highly dependent upon coupler insertion loss.

The cavity finesse (F) may be defined as:

$$F = FSR/\delta f \tag{13}$$

Where FSR is the free spectral range of the resonant cavity (i.e., the distance between the maxima (FIG. 5)); and $\delta f$ is the width of the circulating power maxima (FIG. 5) at one-half of the maximum circulating power (i.e., at one-half power at full resonance). The free spectral range (FSR) may be defined as:

$$FSR = c/nL \tag{14}$$

By setting Equation 9 equal to one-half $|P_{c(4)}/P_i|_{max}$, the full width at half maximum may be found:

$$\delta f = \frac{c}{nL}\left\{1 - \frac{2}{\pi}\sin^{-1}\left[1 - \frac{(1-K_r)^2}{4K_r}\right]^{\frac{1}{2}}\right\} \tag{15}$$

For $K_r$ near unity, $\delta f$ may be approximated as:

$$\delta f = \frac{c}{nL} \frac{1-K_r}{\pi K_r^{\frac{1}{2}}} \tag{16}$$

which is within 0.2% for $K_r$ greater than 0.8.

Substituting Equation 14 and 16 into Equation 13, the cavity finesse is therefore:

$$F = \frac{\pi K_r^{\frac{1}{2}}}{1 - K_r} \tag{17}$$

From Equation 8 the resonant coupling constant $K_r$ is equal to the product of coupler transmission and fiber transmission, so that the quantity $(1-K_r)$ is equal to the total fractional losses around the loop 60. It may be seen from Equation 17 that, as these fractional losses decrease, the finesse increases. Thus, the finesse is highly dependent upon losses, and may be increased by decreasing either the coupler insertion losses or the fiber tranmission losses, or both. For the embodiment shown, the finesse is about 80 and the free spectral range for the 10-meter loop 60 is about 20.6 MHz.

Finally, referring back to FIG. 4, the cavity rise time $T_c$ may be approximated as follows:

$$T_c = \frac{nL/c}{2(1-K_r)} \tag{18}$$

For resonant effects, the laser transmitter 12 should have a coherence length greater than $cT_c$.

Operation As An Acoustic Sensor

The above-described resonator 20 provides a highly sensitive acoustic sensor, which detects the frequency and intensity of acoustic waves impinging upon the fiber loop 60. As the acoustic wavefronts strike the fiber loop 60, the length of the loop 60 is modulated in accordance with the frequency and intensity of the wave fronts. Such modulation of the loop length causes the total roundtrip phase delay through the loop 60 to modulate concomitantly. The laser transmitter 12 supplies an input having a chirp modulated frequency to the resonator 20. The processor 44 measures the center frequency of the output of the resonator 20. The acoustic wavefronts strike the fiber loop 60 and change the resonant frequency thereof. By measuring variations in the center frequency the processor 44 determines the desired parameters of the acoustic wave.

Mach-Zehnder Interferometer

A portion of the light input to port 1 of the coupler 22 is coupled into the fiber 24 and output at port 4. The Mach-Zehnder interferometer 26 comprises a pair of couplers 62 and 64 which couple light between the fiber 24 and a fiber 66. The portions of the fibers 24 and 66 between the coupler 62 and 64 form a reference arm 68 and a sensor arm 70, respectively. Light propagating in the reference arm is called the reference signal, and the light propagating in the sensor arm is called the sensor signal. The coupler 64 couples a portion of the sensor signal into the second end of the fiber 24 while also coupling a portion of the reference signal to port 3 and thus out of the system. A portion of the reference signal propagates to port 4 and combines with the portion of the sensor signal that is coupled into the fiber 24. The result of combining portions of the reference and sensor signals is the formation of an interference pattern between the reference signal and the sensor signal in the fiber 24 at port 4 of the coupler 64. This interference pattern, a function of the phase $\phi$ between the reference signal and the sensor signal, is the output of the Mach-Zehnder interferometer 26 that is coupled into the receive fiber 40 at the coupler 46.

The sensor arm 70 and the reference arm 68 may have lengths such that the sensor and the reference signal combine in phase at port 4 of the coupler 64. The physical parameter to be sensed is coupled to the sensor arm 70 by any convenient means (not shown) depending upon the parameter. Changes in the parameter while the reference arm 68 is isolated from changes in the parameter produce a optical path length change $\delta$ in the sensor arm 70, which results in a phase shift between the reference signal and the sensor signal. The Mach-Zehnder interferometer 26 may be calibrated so that changes in the sensed parameter may be quantitatively related to the amount of phase shift in the interference pattern.

If the light intensity propagating from port 4 of the coupler 22 toward port 2 of the coupler 62 is $I_o$, and the coupler 62 has a coupling efficiency of 50%, then the intensity at ports 3 and 4 of the coupler 62 will be $I_o/2$. The reference signal undergoes a phase shift $\phi_r$ while propagating from the coupler 62 to the coupler 64 while the sensor signal undergoes a phase shift $\phi_s(t)$, which is a function of the phase shift caused by the fiber and fluctuations in the physical parameter being sensed. The intensity I output from port 4 of the coupler 64 is given by $$I = I_o/2[1 - \cos(\phi_s - \phi_r)]$$

The phase changes $\phi_s$ and $\phi_r$ are functions of the optical frequency of the signal input to the Mach-Zehnder interferometer 26.

FIGS. 6 and 7 represent outputs of the resonant sensor 20 and the Mach-Zehnder interferometer 26, respectively as functions of frequency. In FIG. 6, $f_o$ is the resonant frequency of the resonant sensor 20. The resonant frequency depends upon the path length of the resonant sensor 20 that can be made sensitive to the physical phenomenon of interest. In the quiescent state the output of the Mach-Zehnder interferometer is a sinusoidal wave form having phase $\phi_o$. The phase of the output of the Mach-Zehnder interferometer 26 changes to $\phi_1$ when signals related to the physical parameter of interest are applied to the sensor arm 70. The phase $\phi_1$ of the Mach-Zehnder interferometer output signal depends upon the path length difference between the sensing arm 70 and the reference arm 68.

Although other frequency modulation techniques are possible for monitoring the sensor array 15, a suitable sampling technique involves placing a frequency chirped optical pulse on the transmit fiber 14. As is well known, a frequency chirped signal has a frequency which varies lineary with time. Chirping can be accomplished in any one of a number of ways well known in the art. Examples include a Bragg cell, an intra-cavity phase modulator or a movable laser cavity mirror.

Figure 8:
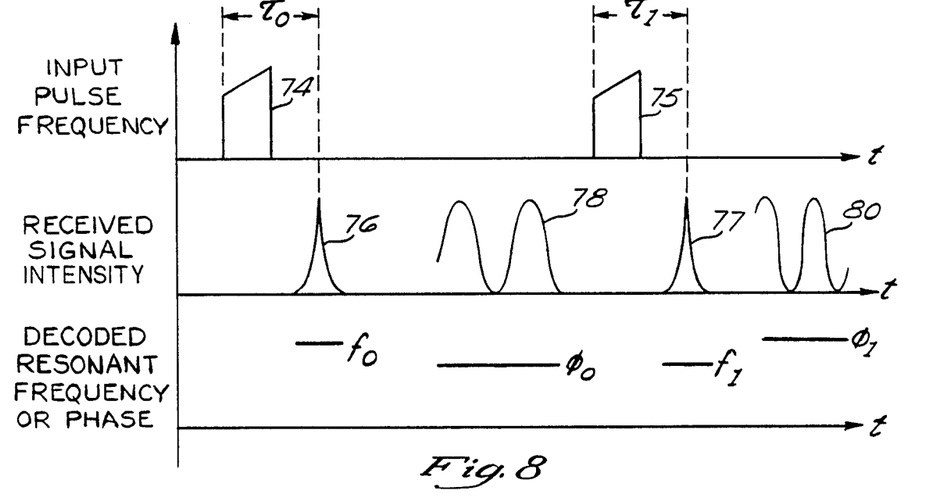
FIG. 8 illustrates the waveforms on the transmit and receive fibers of FIG. 1 for frequency-chirped pulses.

In the exemplary embodiment of FIG. 1, chirping is accomplished by use of a Bragg cell (not shown) placed within the laser transmitter 12. The Bragg cell is driven by a frequency chirped electrical waveform so as to produce the desired frequency chirped optical output from the laser transmitted 12. The pulse width should be less than the round trip transit time between sensors, and the amount of frequency chirp should equal the largest free spectral range of any sensor in the sensor array 15. FIG. 8 illustrates input pulse frequency, received signal and decoded resonant frequency or phase information deduced from the received signal. The period of the pulses should be greater than the round trip transit time of the sensor in the array 15 farthest from the laser transmitter 12.

Referring to FIG. 8, an input frequency chirped pulse 74 causes the resonant sensor 20 to produce a pulse output 76 having a center frequency $f_0$ that is a known function of the instantaneous input frequency. The frequency of the output pulse depends upon the chirp rate. The center frequency $f_0$ is produced after the instantaneous input frequency equals the resonant frequency. The delay is proportional to the chirp rate. By measuring the time difference between transmission of a pulse from the laser transmitter 12 and each pulse received at the receiver 42, the resonant frequency of each one of a plurality of resonant sensors such as the resonant sensor 20 may be measured. The resonant frequency of the resonant sensor 20 may be tuned to be a frequency $f_0$ in the quiescent state of the resonant sensor 20. A change in the physical parameter being monitored by the resonant sensor 20 will change the resonant frequency to a different frequency $f_1$. The difference in resonant frequencies is indicative of the change in the physical parameter being monitored. As shown in FIG. 8, the output pulse from the resonant sensor 20 having the resonant frequency $f_0$ is output a time $\tau_0$ from the time of initiation of the pulse from the laser transmitter 12. A pulse 77 having resonant frequency $f_1$ is output at a time $\tau_1$ from initiation of a second pulse 75 from the laser transmitter 12. The shift in frequency $\Delta f$ is given by the expression $$\Delta f = a(\tau_1 - \tau_0)$$

where a is the chirp rate in for example, Hz/sec.

The phase of the Mach-Zehnder interferometer 26 is determined by the phase of the sinusoidal waveform 78 output therefrom. In the quiescent state the phase of the Mach-Zehnder waveform is indicated as $\phi_0$. A change in the parameter being monitored by the Mach-Zehnder interferometer 26 results in a waveform 80 of phase $\phi_1$ being output in response to the pulse 75 passing through the Mach-Zehnder interferometer 26. The sensor array 15 may include a plurality of Mach-Zehnder interferometers 26. A sinusoidal output waveform can be correlated with a particular Mach-Zehnder sensor by measuring the time between emission of the pulse 75 from the laser transmitter 12 and the receipt of a sinusoidal waveform at the receiver 42 to establish sensor identity. Each sensor in the array 15 will respond with a pulse or sinusoid that is delayed from the input pulse by the transit time from the laser transmitter 12 to the receiver 42 through the sensor.

Figure 9:
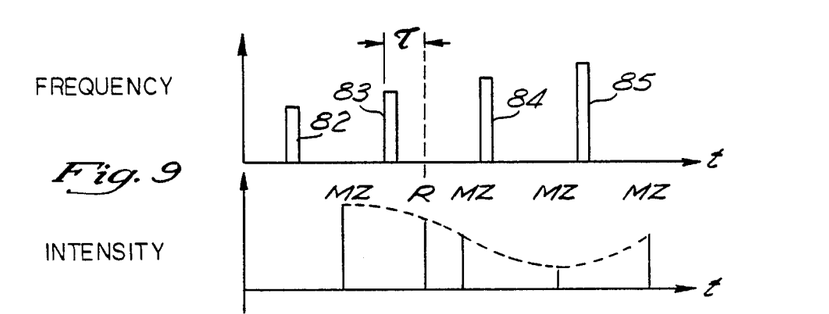
FIG. 9 represents waveforms on the transmit and received fibers of FIG. 1 for frequency stepped pulses.

A second sampling technique involves placing a sequence of pulses 82, 83, 84, and 85 on the transmit fiber 14 with the center frequency of successive pulses being incremented by a constant step to result in an input signal as shown in FIG. 9. The resonant sensor 20 will output a pulse indicated by a line R at a time delay $\tau$ in FIG. 9 on the receive line if the center frequency of the transmitted pulse equals that of the resonant sensor 20. Each input pulse causes the Mach-Zehnder interferometer 26 to output a pulse indicated by a line labeled MZ in FIG. 9 with the pulse intensity being determined by the phase difference between the reference arm 68 and the sensor arm 70 and the frequency of the input pulse.

The resonant frequency of a particular resonant sensor 20 is determined by timing the response or lack thereof of a sensor. In FIG. 9 the resonant sensor gives a response $\tau$ seconds after the second transmitted pulse 83, which indicates that the resonant frequency is the center frequency of the second pulse 83 and that the sensor having this particular resonant frequency is the one having the time delay $\tau$ between transmission of the pulse 83 from the laser transmitter 12 and receipt thereof by the receiver 42. If additional resonant sensors 20 were in the array with the same resonant frequency, the pulse responses would occur at different times because the resonsant sensors are spaced apart along the transmit fiber 14 and the receive fiber 40. If additional resonant sensors had resonant frequencies different from that of the resonant sensor 20, their pulse responses R, would come at predetermined transit times after the laser transmitter 12 emitted the pulses corresponding to the resonant frequencies of the additional resonant sensors. The time between each of the pulses 82-85 is greater than the longest round trip transit time of the signal through the array.

Each Mach-Zehnder interferometer 26 in the array will emit a pulse for each pulse emitted from the laser transmitter 12. The time delay between the transmitted pulse and the corresponding received pulse identifies which sensor a particular pulse is from. By collecting the responses of a plurality of the Mach-Zehnder interferometers over many transmitted pulses, the sinusoidal output of each Mach-Zehnder can be constructed. The phase of the sinusoidal output is the phase difference between the sensor arm 70 and the reference arm 68 of the Mach-Zehnder interferometer 26. The construction of the Mach-Zehnder outputs is accomplished by examining the output pulse heights for each Mach-Zehnder from every transmitted pulse. The pulse heights for each Mach-Zehnder are plotted as functions of the time of the transmitted pulse. The resulting waveform is a time-sampled version of the sinusoidal response of the Mach-Zehnder interferometers.

Although the sensor array 15 has been described with reference to a resonance interferometric sensor 20 and a Mach-Zehnder interferometer 26, any other type of interferometric sensor such as Sagnac and Michelson interferometers could be used in the sensor array 15. In addition, amplitude sensors (not shown) which affect only the amplitude of an applied optical signal may be used in the same array with the various interferometric sensors.

Figure 10A:
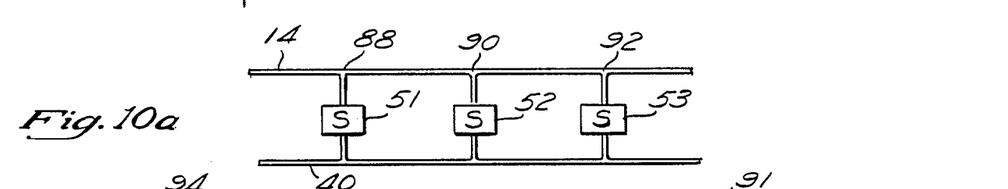
FIGS. 10a-10c illustrate the structures of sensor arrays of the present invention.
Figures 10B, 10C:
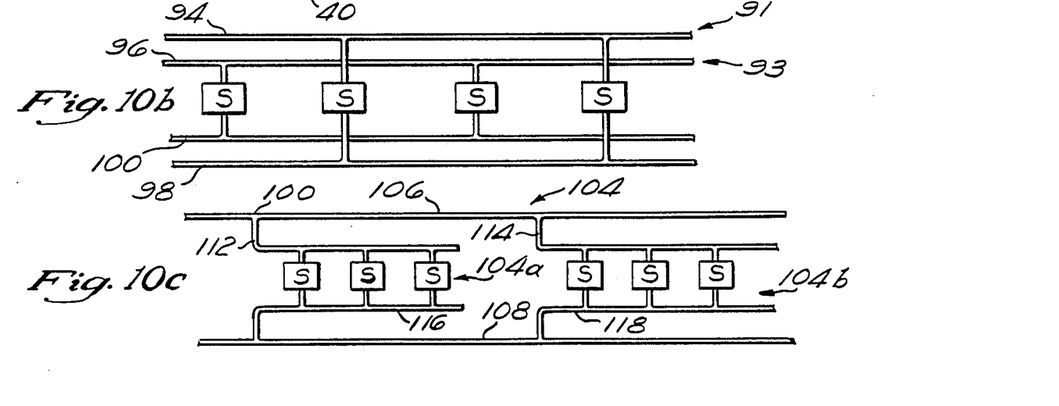

FIGS. 10a-10c illustrate various configurations of the sensor array 15. FIG. 10a shows a plurality of sensors 51, 52, 53, etc. connected between the transmit fiber 14 and the receiver fiber 40 in a parallel ladder-like arrangement. The connections between the sensors 51, 52, 53, etc. and the transmit and receive fibers 14 and 40, respectively, are to be understood to be suitable fiber optic couplers, such as shown in FIGS. 2 and 3. If all of the couplers have the same coupling efficiency, then the signal input to each successive sensor will be a fixed fraction of the input to the preceding sensor. It is possible to "taper" the coupling efficiencies between the sensor inputs and the transmit and receive lines 14 and 40, respectively so that each sensor in the array 15 receives approximately the same input signal intensity.

Such an arrangement uses input couplers 88, 90 and 92 that have increasing coupling efficiencies so that as the intensity of the signal in the transmit fiber 14 decreases, the percentage of coupling to the next sensor increases.

FIG. 10b illustrates a pair of ladder arrays 91 and 93, each being formed similarly to the ladder array 15 of FIG. 10a. The ladder arrays 91 and 93 include transmit fibers 94 and 96, respectively, and receive fibers 98 and 100, respectively. A coupler (not shown) divides the signal from the laser transmitter 12 between the transmit fiber 94 and 96 for input to the ladder arrays 91 and 93. The arrays 91 and 93 may be remote from one another while receiving input signals from the same laser transmitter 12 and using the same receiver 42 and processor 44. Distribution and collection efficiency is defined to be the power from the last sensor in an array at the receiver 42 divided by the total power input to the array. The arrays 91 and 93 are used to increase the distribution and collection efficiency.

FIG. 10c illustrates an array 104 having a plurality of sub-arrays 104a, 104b, etc. connected between a transmit fiber 106 and a receive fiber 108. A first coupler 110 couples signals from the transmit fiber 106 to a secondary transmit fiber 112 which supplies input signals to the first sub-array 104a.

A secondary receiver fiber 116 supplies signals from the sub-array 104a to the receive fiber 108.

Similarly a secondary transmit fiber 114 supplies input signals to the second sub-array 104b and a secondary receive fiber 118 supplies signals from the sub-array 104b to the receive fiber 108. The array 104 is convenient when it is desired to increase the distribution and collection efficiency. Each sub-array 104a, 104b, etc. may contain sensors for monitoring temperature, acoustic vibrations, and electromagnetic fields, for example.

What is claimed is:

1. A fiber optic sensor array, comprising:
   a transmit fiber;
   transmitter means for applying temporal and frequency modulated light signals to said transmit fiber;
   a plurality of passive fiber optic interferometric sensors coupled to said transmit fiber, said plurality of passive fiber optic interferometric sensors being spaced apart from one another to receive light pulses sequentially at predetermined times from said transmitter means, each of said passive fiber optic interferometric sensors being responsive to a predetermined physical parameter; and
   means for monitoring said plurality of passive fiber optic interferometric sensors to detect changes in the physical parameters to which said passive fiber optic interferometric sensors are responsive.

2. The fiber optic sensor array of claim 1 wherein said monitoring means includes:
   a single receive fiber, said single receive fiber being coupled to each of said passive fiber optic interferometric sensors for propagating signals output therefrom;
   receiving means for receiving the sensor output signals propagating in said receive fiber; and
   signal processing means for demodulating the fiber optic interferometric sensor output signals.

3. The fiber optic sensor array of claim 2 further comprising means for correlating the sensor output signals with said sensors.

4. The fiber optic sensor array of claim 3 wherein said correlating means comprises a timing reference for measuring the transit times of light signals through said arrays.

5. The fiber optic sensor array of claim 4 wherein said plurality of passive fiber optic sensors includes at least one resonant interferometric sensor.

6. The fiber optic sensor array of claim 4 wherein said plurality of fiber optic sensors includes at least one Mach-Zehnder interferometric sensor.

7. The fiber optic sensor array of claim 4 further including at least one resonant interferometric sensor and at least one Mach-Zehnder interferometric sensor.

8. The fiber optic sensor array of claim 1 wherein said plurality of passive fiber optic sensors includes at least one resonant interferometric sensor.

9. The fiber optic sensor array of claim 1 wherein said plurality of fiber optic sensors includes at least one Mach-Zehnder interferometric sensor.

10. The fiber optic sensor array of claim 1 further including at least one resonant interferometric sensor and at least one Mach-Zehnder interferometric sensor.

11. The fiber optic sensor array of claim 1, further comprising:
- a plurality of input fiber optic couplers for coupling predetermined portions of the temporal and frequency modulated light signals out of said transmit fiber;
- a plurality of resonant interferometric sensors, each being connected to a corresponding one of said plurality of optical couplers for receiving temporal and frequency modulated light signals therefrom, each of said resonant interferometric sensors being configured to produce sensor outputs that are functions of the temporal and frequency modulated light signals input thereto in response to changes in predetermined physical parameters; and
- optical coupler means corresponding to said plurality of resonant interferometric sensors for coupling the sensor output signals from said resonant sensors into said receive fiber.

12. The fiber optic sensor array of claim 1, further comprising:
- a plurality of input fiber optic couplers for coupling predetermined portions of the temporal and frequency modulated light signals out of said transmit fiber;
- a plurality of Mach-Zehnder interferometric sensors, each being connected to a corresponding of said plurality of optical couplers for receiving light signals therefrom, each of said Mach-Zehnder interferometric sensors being configured to produce sensor outputs that are functions of the temporal and frequency modulated light signals input thereto in response to changes in predetermined physical parameters; and
- optical couplers means corresponding to said plurality of Mach-Zehnder interferometric sensors for coupling the sensor output signals from said Mach-Zehnder interferometric sensors into said receive fiber.

13. The fiber optic sensor array of claim 1, further comprising:
- a first plurality of input fiber optic couplers for coupling predetermined portions of the temporal and frequency modulated light signals out of said transmit fiber;
- a plurality of resonant interferometric sensors, each being connected to a corresponding one of said first plurality of optical couplers to receive temporal and frequency modulated light signals therefrom, said resonant interferometric sensors being configured to produce outputs that are functions of the temporal and frequency modulated light signals input thereto in response to changes in predetermined physical parameters;
- first optical coupler means for coupling the outputs of said plurality of resonant interferometric sensors into said receive fiber;
- a second plurality of fiber optic couplers for coupling predetermined portions of the temporal and frequency modulated light signals from said transmit fiber;
- a plurality of Mach-Zehnder interferometric sensors connected to said second plurality of fiber optic couplers, said plurality of Mach-Zehnder interferometric sensors being configured to produce outputs that are functions of said temporal and frequency modulated light signals in response to changes in predetermined physical parameters; and
- second coupler means for coupling the output signals from said plurality of Mach-Zehnder interferometric signals into said receive fiber.

14. The fiber optic sensor array of claim 2, further comprising:
- first fiber optic coupler means for coupling a first portion of the temporal and frequency modulated light signals out of said transmit fiber;
- a first plurality of fiber optic interferometric sensors connected to receive the output of said first fiber optic coupler means;
- means for coupling the output of said first plurality of passive fiber optic interferometric sensors into said receive fiber;
- second fiber optic coupler means for coupling a second portion of the temporal and frequency modulated light signals out of said transmit fiber;
- a second plurality of passive fiber optic interferometric sensors connected to receive temporal and frequency modulated light signals from said second coupler means; and
- means for coupling optical signals from said second plurality of passive fiber optic interferometric sensors into said receive fiber.

15. A fiber optic sensor array, comprising:
- a first transmit optical fiber;
- a second transmit optical fiber;
- transmitter means for applying temporal and frequency modulated light signals to said first and second transmit fibers;
- a first plurality of passive fiber optic interferometric sensors coupled to said first transmit fiber, each of said first plurality of passive fiber optic interferometric sensors being responsive to changes in predetermined physical parameters;
- a first receive optical fiber connected to said first plurality of passive fiber optic interferometric sensors to receive output signals therefrom;
- a second plurality of passive fiber optic interferometric sensors coupled to said second transmit fiber, each of said second plurality of passive fiber optic interferometric sensors being responsive to changes in predetermined physical parameters;
- a second receive optical fiber connected to said first plurality of passive fiber optic interferometric sensors to receive output signals therefrom; and
- means for monitoring said first plurality of passive fiber optic interferometric sensors and said second plurality of passive fiber optic interferometric sensors to detect changes in the physical parameters to which each of said passive fiber optic interferometric sensors are responsive.

16. The fiber optic sensor array of claim 1 including means for chirp modulating the frequency of the light signals propagating in said transmit fiber to provide sensor output waveforms that represent the outputs of said plurality of passive fiber optic interferometric sensors as functions of time.

17. The fiber optic sensor array of claim 1 including means for frequency modulating the light signals propagating in said transmit fiber to provide sensor output waveforms that represent the outputs of said plurality of passive fiber optic interferometric sensors as functions of frequency.

18. A method for sensing physical parameters, comprising the steps of:
- connecting a transmit fiber to a laser transmitter;

applying temporal and frequency modulated light signals from the laser transmitter to the transmit fiber;

connecting a plurality of passive fiber optic interferometric sensors to the transmit fiber with each of the passive fiber optic interferometric sensors being spaced apart from one another to receive light pulses sequentially at predetermined times from the laser transmitter, each of the sensors being responsive to a predetermined physical parameter; and monitoring the output signals of the plurality of passive interferometric sensors to detect changes in the physical parameters to which the passive interferometric sensors are responsive.

19. The method of claim 18, further comprising the step of coupling a receive fiber to each of said plurality of passive interferometric sensors.

20. The method of claim 19, further comprising the step of coupling at least one resonant interferometric sensor between the transmit fiber and the receive fiber.

21. The method of claim 19, further comprising the step of connecting at least one Mach-Zehnder interferometric sensor between the transmit fiber and the receive fiber.

22. The method of claim 19, further comprising the steps of:

coupling at least one resonant interferometric sensor between the transmit fiber and the receive fiber; and coupling at least one Mach-Zehnder interferometric sensor between the transmit fiber and the receive fiber.

23. The method of claim 19, further including the steps of:

producing electrical signals indicative of the sensor output signals being propagated in the receive fiber;

processing the electrical signals to determine changes in the physical parameters being monitored by the plurality of passive fiber optic interferometric sensors; and timing the interval between the transmission of a modulated light signal and the receipt of output pulses from the plurality of passive fiber optic interferometric sensors to correlate the output pulses with the passive fiber optic interferometric sensors.

24. The method of claim 23 further including the step of chirp modulating the frequency of the light signals propagating in the transmit fiber to provide sensor output wave forms that represent the outputs of said plurality of passive fiber optic interferometric sensors as functions of time.

25. The method of claim 23 further including the step of frequency modulating the light signals propagating in the transmit fiber to provide sensor output waveforms that represent the outputs of said plurality of passive fiber optic interferometric sensors as functions of frequency.

* * * * *